Dec. 1, 1959
H. GUGGENHEIM ET AL
2,915,399
PROCESS FOR MANUFACTURE OF SOLUBLE COFFEE
Filed Aug. 17, 1956
FIG. 1.
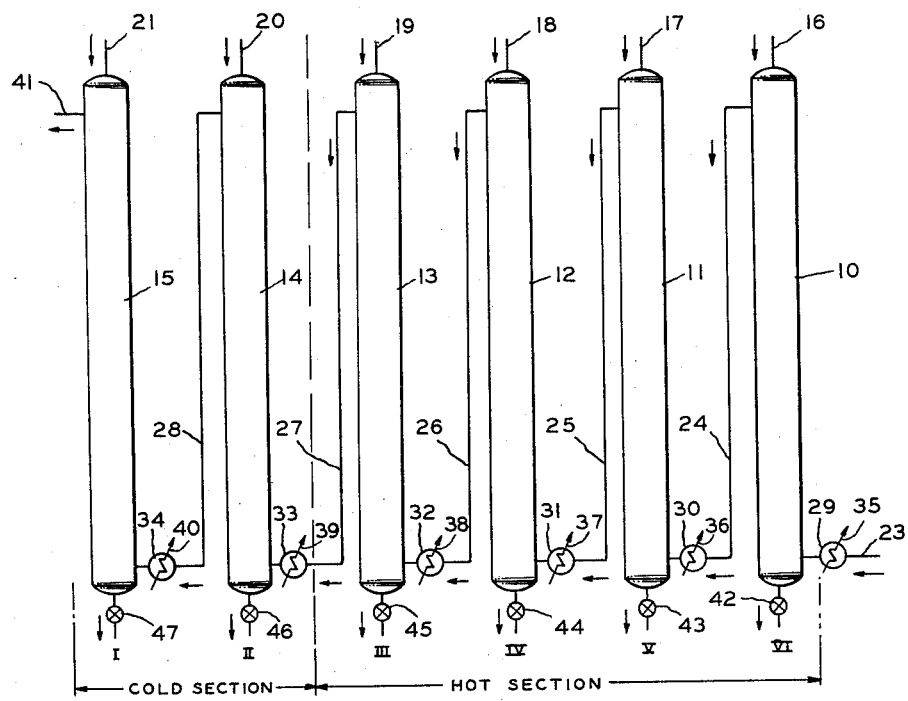
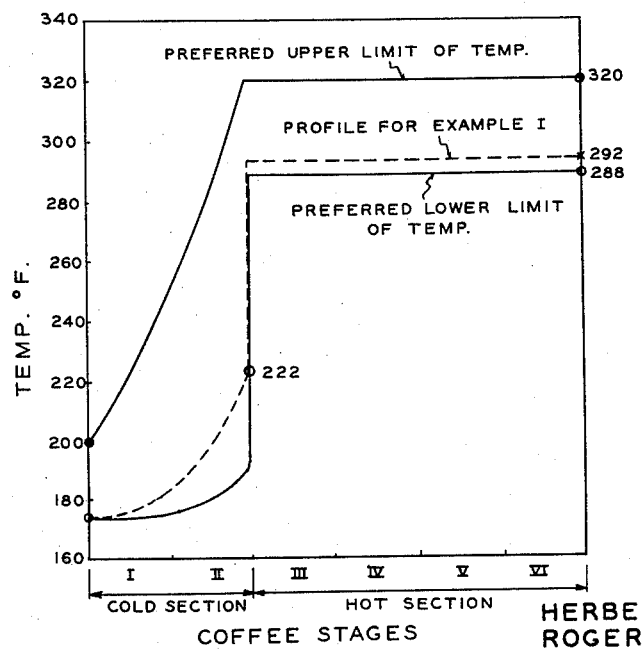
FIG. 2.
INVENTORS
HERBERT GUGGENHEIM
ROGER M. STINCHFIELD
BY Frederick F. Mack and
Sidney M. Hones
ATTORNEYS United States Patent Office 2,915,399
Patented Dec. 1, 1959

2,915,399

PROCESS FOR MANUFACTURE OF SOLUBLE COFFEE

Herbert Guggenheim, Brooklyn, N.Y., and Roger M. Stinchfield, Mountain Lakes, N.J., assignors to General Foods Corporation, New York, N.Y., a corporation of Delaware Application August 17, 1956, Serial No. 604,651

7 Claims. (Cl. 99—71)

This invention relates to a method of producing coffee extract in the form of syrup or dry soluble powder. More specifically it relates to an improved process by which it is possible to obtain high concentration of a concentrated coffee extract characterized by desirable flavor, taste, and aroma.

When ground roasted coffee is contacted with water, e.g. boiling water, to extract solubles therefrom at atmospheric pressure, it will be found that approximately 25% by weight of the original coffee will pass into solution. If the residual coffee grounds are then subjected to severe extraction conditions, i.e. higher temperatures and pressures, either with the same liquid or with fresh water, it will be found that approximately 23% more solubles may be extracted, making a total of about 48% extracted solubles. The additional 23% solubles may be considered coffee solids produced by hydrolysis or autoclaving and may include components having undesirable flavor. After this point has been reached, further attempts at extraction under still more severe temperature and pressure conditions, result in precipitation rather than solubilization and the total concentration of solubles formed drops rather than rises under these extended conditions. The 48% total extract is characterized by low consumer acceptance because of its undesirable flavor, aroma and taste.

Instant or soluble coffee may be prepared commercially by passing water through a bed of ground roasted coffee in a percolator or extraction column. When feed water is passed through a single bed of coffee grounds, the concentration of solubles in the extract is of a low order, usually only a few percent and accordingly it is necessary to pass this dilute extract through additional beds of coffee grounds in subsequent percolators to get higher concentrations of coffee in the extract liquor. The process is conducted semi-continuously in counter-current manner so that fresh extracting liquor entering the system at one end is continuously concentrated as it contacts fresher coffee grounds in successive percolators. Each percolator is initially filled with a bed of fresh coffee grounds and when the content of solubles in the bed of the last stage has been lowered to the desired point, that percolator is disconnected from the system and spent coffee grounds withdrawn therefrom. Simultaneously a freshly filled percolator is placed on stream at the other end as the new first stage of the series of percolators, that percolator which formerly was the first stage now becoming the second stage, etc.

The stages of extraction are designated as coffee-stages, i.e., the stage wherein the most concentrated extraction liquor contacts fresh coffee grounds is designated the first coffee stage, and that wherein the fresh extraction liquor contacts substantially spent coffee grounds is designated the last coffee stage.

When solubles are extracted from the coffee bean by hot water according to prior art processes, the feed water is initially heated to as high a temperature as is possible or desirable under the conditions of operation, and admitted to the last stage of a series of percolators. As the water passes through each percolator, its temperature drops and the temperature profile curve over the entire operation gradually slopes downwardly. This more-or-less standard profile curve may be modified to some extent by increasing or decreasing the temperature of the feed water which raises or lowers the profile curve as it is customarily plotted in terms of temperature as the dependent variable against time as the independent variable.

When the concentrated infusion is dried, as by spray drying, to recover the soluble coffee solids in the form of particles or powder, the amount of heat which must be supplied to the drying operation to effect evaporation of the large quantities of water vaporized is substantial. For example, when the extract liquor contains 25% solubles, the drier must evaporate three pounds of water for each pound of soluble coffee powder produced. Increase in concentration of solubles in the draw-off is desirable as it will permit decreased handling cost and greater throughput with existing driers i.e. production of larger amounts of soluble coffee powder per pound of water evaporated in the drier.

High draw-off concentration permits attainment of soluble coffee powder characterized by desirably darker color, more desirable particle size, and greater retention of volatile flavors or aroma. When, in prior art processes, attempts have been made to increase the soluble content of the draw-off to concentrations above 25%–30%, it is found that this can only be accomplished at the expense of consumer acceptance. Increasing the number of percolators has been found to be of no avail, since a larger number of percolators does not permit attainment of any significantly higher concentrations. Use of higher temperature feed water does yield an extract containing more solubles, but the various severe reactions occurring at the higher temperatures, e.g., autoclaving and hydrolysis, give to the soluble coffee an undesirable flavor, taste, and aroma and result in unfavorable consumer reaction to coffee beverage made from the soluble product. Furthermore, in the prior art processes, when ground roasted coffee is extracted under conditions which give high concentrations, the amount of unrecovered soluble solids may be high. This represents undesirable loss resulting directly from excessive heat treatment of recovered soluble solids, with attendant impairment of quality and consumer acceptance.

It is an object of this invention to extract solubles from coffee under conditions permitting attainment of high concentration of solubles in the draw-off. A second object of this invention is to obtain soluble coffee powder having a high level of consumer acceptance, a highly desirable flavor, and darker color. A further object of this invention is to obtain a better quality (i.e. better flavor) soluble coffee than obtained by the prior art. Other objects will be apparent to those skilled in the art on inspection of the following description and accompanying drawings.

In accordance with this invention, an extract of highly concentrated coffee solids is obtained by countercurrent extraction in a two section extraction system including a hot section and a cold section. Each of these sections is characterized and defined by the temperatures prevailing therewithin as hereinafter described in detail.

The coffee extracted will be roasted coffee. While whole beans may be treated, best results are attained with ground roasted coffee. This process is particularly adapted to percolators and accordingly the ground roasted coffee may be packed in percolators at least one percolator being included within each of the above-noted sections of the percolation train.

Preferably the charge extraction liquor admitted to the first percolator in the hot section will be water, but it may be a dilute aqueous extraction liquor containing soluble coffee from any convenient source. Feed water to the hot section may be at temperatures of 288° F. to 320° F., preferably 292° F. The extraction time (i.e. the time of residence of coffee grounds) in this section may range from 40 to 110 minutes, preferably about 90 minutes. The total extraction time is about 100–200 minutes, preferably 165 minutes for the overall cycle. The extraction liquor leaving the hot section may contain 10% to 30%, e.g. 15% solubles. Operations in the hot section may be effected in a single percolator or in several percolators.

Although the liquor leaving the hot section of the extraction train may be as much as 2° F.–10° F. cooler than the charge extraction liquor, preferably operations in this section will be conducted to maintain as constant a temperature as is possible. This may be accomplished by heaters which compensate to desired extent for any heat losses in the several percolators in the hot section of the extraction train.

Effluent from the hot section is admitted to the cold section wherein it is cooled to temperature less than the outlet temperature of the hot section as it is contacted with fresher coffee grounds, the coffee grounds in the last percolator in this section being most fresh coffee. Immediately prior to and during its passage through the cold section, the temperature of the infusion may be lowered by contact with the cooler coffee grounds and cooler percolators, by natural convection, by heat exchange, or by any one or more of these, so that the draw-off temperature is 175° F. to 200° F., preferably about 175° F. Preferably this will be accomplished, to large extent at least, by natural convection. Extraction time in the cold section may be 60 minutes to 90 minutes, preferably about 75 minutes. The concentration of solubles in the effluent or draw-off from the cold section may be as high as 35% to 45%, e.g. 40%.

Fig. 2 shows in diagrammatic form, the preferred ranges of temperature in the hot and cold sections of the percolation train. Along the bottom of the graph are plotted "coffee stages" which represent a time base according to which coffee is admitted to the system at a point corresponding to the left end of the time base, passes through the system, and leaves the system at a point corresponding to the right end of the graph. Aqueous extraction liquor, passing countercurrent to the coffee, enters the system at a point corresponding to the right end of the time base, passes through the system, and leaves the system at a point corresponding to the left end of the graph. The vertical coordinates indicate the temperature prevailing within the system. No particular significance is to be attributed to the specific times or the number of stages indicated for each of the sections; the time of extraction in each section may vary as hereinbefore indicated.

Because of the semi-continuous nature of the process, it will also be apparent to those skilled in the art that the temperatures in a given percolator and in each section will vary from time to time. For example, when a percolator containing fresh coffee grounds is placed on stream, the temperature in that percolator will be lower than it will be after the infusion has been passing therethrough for some period of time. Accordingly, the plotted temperatures are those prevailing just prior to the time when the last percolator is blown down. Similarly, temperatures referred to elsewhere in this specification are also noted just prior to blow down.

During operation of the process, water will be admitted at temperature corresponding to the right end of the band of the graph of Fig. 2. It will be maintained during its passage through the hot section of the percolation train at substantially constant temperature falling within the range bounded by the right end portion of the band corresponding to the hot section of the percolation train. Subsequently as the infusion passes through the cold section, it will cool within the limits defined by the left end portion of the band, and the draw-off temperature of the infusion will be 175° F.–200° F. as shown by the left end of the band.

The concentrated extract may be passed to a spray drier to evaporate water therefrom. Spray drying of the extract provides a soluble coffee powder having a desirably darker color.

The soluble coffee powder prepared according to this process is found to be highly acceptable to the consumer even when the concentration in the draw-off liquor from which it is prepared is as high as e.g. 41%–45%. It is characterized by desirable flavor and aroma and by the complete absence of those attributes generally resulting from excessive autoclaving or hydrolysis.

In order to illustrate the process, a preferred method of operation will be described in connection with the attached drawing, Fig. 1 of which illustrates a flow sheet of one embodiment according to which the process may be conducted. It will be understood by those skilled in the art that various modifications and changes may be made and that the attached drawings and the following description are illustrative only.

In Fig. 1 of the drawing, a plurality of percolators or extraction columns 10, 11, 12, 13, 14, and 15 are shown. Each percolator contains therewithin a screen (not shown) at the bottom thereof and a suitable screening device (also not shown) positioned in the upper part of the percolator whereby coffee is prevented from being carried out of the bed by the upflowing extraction liquor. Each percolator has at its upper end a charge line 16, 17, 18, 19, 20 and 21, schematically shown, through which fresh charge coffee may be admitted to the percolator. The lower portion of each of the percolators is fitted with a coffee discharge or blow down line through which coffee may be removed from the column when the appropriate blow down valve 42, 43, 44, 45, 46, or 47 is opened.

Each percolator has a liquid inlet line 23, 24, 25, 26, 27, and 28 leading to the lower portion thereof. Each of the percolators is also fitted with a liquid outlet line leading from the top thereof. The outlet line from each percolator connects directly with the inlet line to the next succeeding percolator, whereby as liquid flows respectively through percolators 10, 11, 12, 13, 14, and 15, it passes through lines 23, 24, 25, 26, 27, 28 and is discharged from the system through line 41.

Each percolator is fitted with a heat exchanger 29, 30, 31, 32, 33 and 34, which may be an intracolumnar heat exchanger, but preferably it will be positioned in the liquid inlet lines just before they enter the percolators. Each heat exchanger is provided with a heat exchange fluid line 35, 36, 37, 38, 39 and 40 through which appropriate heat exchange medium, e.g. cooling water or steam as hereinafter described, may be passed to modify the temperature of liquid admitted to the percolator. During a particular sequence of operations some of the heat exchangers may not be employed. It will be understood that although the drawing shows a system containing six percolators, the number may be varied depending upon the prevailing conditions.

*Example 1*

In typical operation of the process according to one embodiment, extraction of coffee solubles was effected in the six-column system set forth in Fig. 1 of the drawing. Each column was originally charged with 185 pounds of ground, roasted, blended coffee.

It will be apparent to those skilled in the art that when starting up such a system, a certain period of time is required to bring the system to equilibrium i.e. to attain steady operating conditions. Under conditions which prevail during steady operation of the process, feed water admitted through line 23 at pressure of about 200 p.s.i.g. was heated by steam from line 35 in heat exchanger 29 to 292° F. This water was admitted to the bottom of percolator 10, which in this embodiment comprises the first percolator of the hot section of the percolation train. The coffee grounds contained within percolator 10 were nearly spent coffee grounds which had had the major portion of their solubles extracted therefrom. The coffee grounds in this percolator (and in each of the subsequent percolators herein described) were contacted with extraction liquor for total period of about 165 minutes between filling and blow down. The charge liquor leaving percolator 10 contained 1.9% by weight of soluble coffee just before blow down.

The extract was passed through line 24 to percolator 11 of the percolator train. It was heated in heat exchanger 30 by steam from line 36 to temperature of 292° F. and then admitted to percolator 11. Here it passed upwardly through a bed of coffee grounds which were fresher i.e. which contained more solubles, than the coffee in percolator 10. Draw-off from the top of percolator 11, containing 8% coffee solubles therein, was passed through line 25 to heat exchanger 31, wherein it was heated by steam from line 37 to temperature of 292° F. This hot extraction liquor was passed upwardly through percolator 12 and left the same through line 26 at concentration of 15% coffee solubles. Heating in heat exchanger 32, by steam from line 38, raised the temperature of the extraction liquor to 292° F. The heated liquor was thence passed upwardly through the bed of coffee in percolator 13 and was therein concentrated to 20% coffee solubles. In this embodiment, the total time of contact of coffee with extraction liquor in the hot section, comprising percolators 10, 11, 12, and 13 was 90 minutes.

Extraction liquor, containing 20% coffee solubles. was then passed to the cold section of the extraction train comprising percolators 14 and 15. This liquor was passed through line 27 to percolator 14. As admitted thereto, the liquor was at temperature of 222° F. Although cooling in the cold section of the extraction train may be effected by heat exchangers 33 and 34, they were not used in this example. Cooling was obtained by natural convection. The extract was contacted with coffee grounds in percolator 14, the effluent from which in line 28 contained about 28% solubles. Extraction liquor at 180° F. was passed upwardly through percolator 15. Here the upflowing extraction liquor contacted coffee grounds which were substantially fresh.

Draw-off in line 41 from percolator 15 was at temperature of 175° F. Total time of contact of coffee grounds with the extracting liquor in the cooling section of the percolation train of this example was 75 minutes. Concentration of solubles in the draw-off was 40%.

During the course of this example, the average draw-off factor, i.e. the ratio of weight of extract solution passed through a bed of ground coffee to the weight of ground coffee in the bed was 0.78. Concentration of solubles in the extraction liquor just before blow down, which number is an indication of the thoroughness of extraction, was 1.9%. Powdered coffee, produced by spray drying the draw-off infusion, had a desirably dark color. Pressure in the several percolators was adequate to maintain liquid phase operations therewithin.

The dashed curve of Fig. 2 shows the temperature characteristics of this embodiment of the invention plotted as hereinbefore described. As shown in that curve, the feed water enters the hot section of the percolation train at 292° F.; it remains at substantially this temperature as it passes through the hot section; and it cools to 175° F. during its passage through the cold section.

Although there is herein described a specific embodiment of this invention, it will be apparent to those skilled in the art that various changes and modifications may be made thereto which come within the scope of this invention.

What is claimed is:

1. A coffee extraction process for producing concentrated coffee extract by contacting progressively fresher coffee grounds countercurrently with an aqueous extraction liquor which comprises passing the extraction liquor through a hot section of an extraction train containing nearly spent grounds at the liquor inlet end, said liquor being admitted thereto and maintained therein at temperature within the range of 288° F.–320° F., withdrawing partially concentrated extraction liquor from said hot section, and completing the extraction by passing said liquor through a cold section containing fresh coffee grounds at the liquor outlet end and wherein the temperature of said extraction liquor decreases to an outlet temperature of about 175° F–200° F., the fully concentrated extraction liquor being withdrawn from the fresh grounds at said outlet temperature of about 175° F.–200° F.

2. A coffee extraction process for producing concentrated coffee extract by contacting coffee grounds countercurrently with an aqueous extraction liquor as claimed in claim 1 wherein the temperature drop of said aqueous extraction liquor is less than 10° F. as it passes through said hot section of the extraction train.

3. A coffee extraction process for producing concentrated coffee extract by contacting coffee grounds countercurrently with an aqueous extraction liquor as claimed in claim 1 wherein the said aqueous extraction liquor is cooled by natural convection as it passes through said cold section of the extraction train.

4. A coffee extraction process for producing concentrated coffee extract by contacting progressively fresher coffee grounds countercurrently with an aqueous extraction liquor which comprises passing the extraction liquor through a hot section of an extraction train containing nearly spent grounds at the liquor inlet end, said liquor being admitted thereto and maintained therein for 40–100 minutes at substantially constant temperature within the range of 288° F.–320° F., withdrawing partially concentrated extraction liquor from said hot section, and completing the extraction by passing said liquor through a cold section containing fresh coffee grounds at the liquor outlet end for 60–90 minutes wherein the temperature of extraction liquor decreases to an outlet temperature of about 175° F.–200° F., the fully concentrated extraction liquor being withdrawn from the fresh coffee grounds at said outlet temperature of about 175° F.–200° F.

5. A coffee extraction process for producing concentrated coffee extract by contacting progressively fresher coffee grounds countercurrently with an aqueous extraction liquor which comprises passing the extraction liquor through a hot section of an extraction train containing nearly spent grounds at the liquor inlet end, said liquor being admitted thereto and maintained therein for 40–100 minutes at substantially constant temperature within the range of 288° F.–320° F., withdrawing partially concentrated extraction liquor from said hot section containing 10%–30% soluble coffee, completing the extraction by passing said liquor through a cold section containing fresh coffee grounds at the liquor outlet end for 60–90 minutes wherein the temperature of extraction liquor decreases to an outlet temperature of about 175° F.–200° F., the fully concentrated extraction liquor being withdrawn from the fresh grounds at said outlet temperature of about 175° F.–200° F., and spray drying said fully concentrated liquor.

6. A coffee extraction process for producing concentrated coffee extract by contacting progressively fresher coffee grounds countercurrently with an aqueous extraction liquor which comprises passing the extraction liquor through a hot section of an extraction train containing nearly spent grounds at the liquor inlet end, said liquor being admitted thereto and maintained therein at about 292° F., withdrawing partially concentrated extraction liquor from said hot section, and completing the extraction by passing said liquor through a cold section containing fresh coffee grounds at the liquor outlet end and wherein the temperature decreases to an outlet temperature of about 175° F., the fully concentrated extraction liquor being withdrawn from the fresh grounds at said outlet temperature of about 175° F.

7. A coffee extraction process for producing concentrated coffee extract by contacting progressively fresher coffee grounds countercurrently with an aqueous extraction liquor which comprises passing the extraction liquor through a hot section of an extraction train containing nearly spent grounds at the liquor inlet end, said liquor being admitted thereto and maintained therein for about 90 minutes at temperature of about 292° F., partially concentrated extraction liquor from said hot section containing about 15% soluble coffee, and completing the extraction by passing said liquor through a cold section containing fresh coffee grounds at the liquor outlet end and for about 75 minutes wherein the temperature decreases to an outlet temperature of about 175° F., the fully concentrated extraction liquor being withdrawn from the fresh grounds at said outlet temperature of about 175° F. and containing about 40% soluble coffee.

References Cited in the file of this patent

UNITED STATES PATENTS

| | | |
|---|---|---|
| 1,925,159 | Wendt | Sept. 5, 1933 |
| 2,410,157 | Fredrickson | Oct. 28, 1946 |
| 2,515,730 | Ornfelt | July 18, 1950 |
| 2,758,927 | Chase | Aug. 14, 1956 |